(12) United States Patent
Zimmerman

(10) Patent No.: US 11,988,242 B2
(45) Date of Patent: May 21, 2024

(54) VALVE-ACTUATED SUCTION APPARATUS

(71) Applicant: Mighty Ventures, Inc., Rahway, NJ (US)

(72) Inventor: Israel Harry Zimmerman, Los Angeles, CA (US)

( * ) Notice: Subject to any disclaimer, the term of this patent is extended or adjusted under 35 U.S.C. 154(b) by 0 days.

(21) Appl. No.: 17/656,593

(22) Filed: Mar. 25, 2022

(65) Prior Publication Data
US 2023/0304527 A1    Sep. 28, 2023

(51) Int. Cl.
*F16B 47/00* (2006.01)

(52) U.S. Cl.
CPC .................................. *F16B 47/00* (2013.01)

(58) Field of Classification Search
CPC ........ F16B 47/00; F16K 24/04; F16M 13/022
USPC ... 248/467, 537, 205.5, 205.8, 206.2, 206.3, 248/309.3, 362, 363
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,319,726 A | 5/1943 | Duggan |
| 2,319,727 A | 5/1943 | Duggan |
| 2,542,400 A | 3/1948 | Donofrio |
| 2,565,793 A | 8/1951 | Weismantel |
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |

(Continued)

FOREIGN PATENT DOCUMENTS

| | | |
|---|---|---|
| CN | 1079886 A1 | 12/1993 |
| CN | 203987324 U | 12/2014 |

(Continued)

OTHER PUBLICATIONS

Zimmerman, "List Of Patent Applications or Patent Applications Treated As Related", Mar. 17, 2023, 2 pages.

*Primary Examiner* — Muhammad Ijaz
(74) *Attorney, Agent, or Firm* — Walter W. Duft

(57) ABSTRACT

A valve-actuated suction apparatus includes an anchor member having a base seal member and a stem formed with a vent port. A plunger valve is slidably disposed in the vent port and is slidable between closed and open positions. The plunger valve has a plunger head and first and second valve stem sections respectively disposed in first and second vent port sections when the plunger valve is closed. The first valve stem section includes a valve stem stabilizer and an air bypass neck. The valve stem stabilizer controls and limits plunger valve movement within the first vent port section and the valve stem air bypass neck channels air through the second vent port section. The second valve stem section includes a vent port stopper that may be configured in various ways to plug the second vent port section when the plunger valve is closed.

21 Claims, 9 Drawing Sheets

(56) References Cited

U.S. PATENT DOCUMENTS

| | | | |
|---|---|---|---|
| 2,936,139 A | 5/1960 | Lindstrom | |
| 2,963,256 A | 12/1960 | Borah | |
| 2,968,888 A | 1/1961 | Borah | |
| 3,094,235 A | 6/1963 | Lunning | |
| 3,159,370 A | 12/1964 | Rubinstein | |
| 3,383,001 A | 5/1968 | Wei | |
| 3,675,886 A | 7/1972 | Kampmier | |
| 3,847,324 A | 11/1974 | Uchanski et al. | |
| 4,040,549 A | 8/1977 | Sadler | |
| 4,127,211 A | 11/1978 | Zerbey | |
| 4,133,575 A | 1/1979 | Mader | |
| 4,137,356 A | 1/1979 | Shoemaker et al. | |
| 4,593,947 A | 6/1986 | Yokum | |
| 4,726,553 A | 2/1988 | Wischusen, III | |
| 4,756,497 A | 7/1988 | Lan | |
| 4,759,525 A | 7/1988 | Cross et al. | |
| 4,760,987 A | 8/1988 | Lan | |
| 4,836,488 A | 6/1989 | Ross | |
| 4,872,721 A | 10/1989 | Sniadach | |
| 4,890,760 A | 1/1990 | Nicoll, Sr. et al. | |
| 4,928,848 A | 5/1990 | Ballway | |
| 4,940,138 A | 7/1990 | Hornstein | |
| 4,941,635 A | 7/1990 | Lan | |
| 4,955,493 A | 9/1990 | Touzani | |
| 4,978,566 A | 12/1990 | Scheurer et al. | |
| 5,040,719 A | 8/1991 | Ballway | |
| 5,065,973 A | 11/1991 | Wang | |
| 5,071,096 A | 12/1991 | Hartman et al. | |
| 5,076,527 A | 12/1991 | Yung-Huei | |
| 5,133,524 A | 7/1992 | Liu | |
| 5,180,132 A | 1/1993 | Pearson et al. | |
| 5,186,350 A | 2/1993 | McBride | |
| 5,190,332 A | 3/1993 | Nagai | |
| 5,192,043 A | 3/1993 | Fa | |
| 5,207,076 A | 5/1993 | Sciarrillo | |
| 5,213,385 A | 5/1993 | Nagai | |
| 5,263,760 A * | 11/1993 | Sohol | B60J 3/02 248/467 |
| 5,273,182 A | 12/1993 | Laybourne | |
| 5,282,541 A | 2/1994 | Chen | |
| 5,292,140 A | 3/1994 | Laing | |
| 5,381,990 A | 1/1995 | Belokin | |
| D357,170 S | 4/1995 | Wellsfry | |
| 5,413,302 A | 5/1995 | Ferster | |
| 5,511,752 A | 4/1996 | Trethewey | |
| 5,531,353 A | 7/1996 | Ward et al. | |
| 5,651,520 A | 7/1997 | Belokin et al. | |
| 5,667,180 A | 9/1997 | Duckworth | |
| 5,742,971 A | 4/1998 | Salinger | |
| D397,915 S | 9/1998 | McNaughton | |
| D400,763 S | 11/1998 | Taylor et al. | |
| 5,992,806 A * | 11/1999 | Adams | F16B 15/06 248/205.8 |
| 6,000,575 A | 12/1999 | LaCour et al. | |
| 6,039,206 A | 3/2000 | DeFrancesco | |
| 6,059,138 A | 5/2000 | Labruyere | |
| D439,116 S | 3/2001 | White | |
| 6,264,054 B1 | 7/2001 | Miyake et al. | |
| 6,315,153 B1 | 11/2001 | Osborn | |
| 6,318,683 B1 | 11/2001 | Savoy | |
| 6,367,652 B1 | 4/2002 | Toida et al. | |
| 6,439,418 B1 | 8/2002 | Immerman et al. | |
| 6,491,265 B2 | 12/2002 | Tracy | |
| 6,497,394 B1 | 12/2002 | Dunchock | |
| 6,511,031 B2 | 1/2003 | Lin | |
| 6,520,368 B1 | 2/2003 | Chiu | |
| 6,543,637 B1 | 4/2003 | Osborn | |
| 6,571,976 B1 | 6/2003 | Sonnabend | |
| 6,596,374 B1 | 7/2003 | Adjeleian | |
| 6,648,285 B1 | 11/2003 | Woollen | |
| 6,666,420 B1 | 12/2003 | Carnevali | |
| 6,745,987 B2 | 6/2004 | Rousselet et al. | |
| 6,749,160 B1 | 6/2004 | Richter | |
| 6,776,368 B1 | 8/2004 | Duncan et al. | |
| 6,895,642 B2 | 5/2005 | Huang | |
| 7,090,183 B2 | 8/2006 | Heybl et al. | |
| 7,178,771 B2 | 2/2007 | Richter | |
| 7,201,285 B2 | 4/2007 | Beggins | |
| 7,306,113 B2 | 12/2007 | El-Saden et al. | |
| 7,344,114 B2 | 3/2008 | Richter | |
| 7,458,541 B1 | 12/2008 | Chang | |
| 7,481,329 B2 | 1/2009 | Camp, Jr. | |
| 7,726,715 B2 | 6/2010 | Nagasawa et al. | |
| 8,025,169 B2 | 9/2011 | Zimmerman | |
| 8,028,850 B2 | 10/2011 | Zimmerman | |
| 8,272,523 B1 | 9/2012 | DeMusis, Sr. | |
| 8,534,633 B2 | 9/2013 | Tell | |
| 8,560,031 B2 | 10/2013 | Barnett | |
| 8,757,418 B2 | 6/2014 | Zimmerman | |
| 9,494,184 B1 | 11/2016 | Lee | |
| 9,521,919 B1 | 12/2016 | Reyes | |
| 9,651,229 B1 | 5/2017 | Huang | |
| 9,801,483 B2 | 10/2017 | D'Alesio | |
| 9,803,682 B1 | 10/2017 | Chang | |
| 9,814,332 B2 | 11/2017 | Zimmerman | |
| 9,936,828 B1 * | 4/2018 | Adams, IV | A47G 1/17 |
| 10,520,009 B2 | 12/2019 | Smith et al. | |
| 10,753,384 B1 * | 8/2020 | Chang | F16K 15/147 |
| 10,774,870 B2 | 9/2020 | Kang | |
| 11,255,482 B1 | 2/2022 | Zimmerman | |
| 11,415,266 B2 | 8/2022 | Zimmerman | |
| 11,525,475 B2 | 12/2022 | Zimmerman | |
| 11,552,998 B2 | 1/2023 | Haid et al. | |
| 2002/0130133 A1 | 9/2002 | Immerman et al. | |
| 2003/0075666 A1 | 4/2003 | Dunchock | |
| 2003/0102320 A1 | 6/2003 | Park | |
| 2004/0178315 A1 | 9/2004 | Lee | |
| 2004/0238541 A1 | 12/2004 | Camp, Jr. | |
| 2004/0238542 A1 | 12/2004 | Camp, Jr. et al. | |
| 2005/0075666 A1 | 4/2005 | Maas et al. | |
| 2006/0175506 A1 | 8/2006 | Lan | |
| 2007/0012706 A1 | 1/2007 | Deadman | |
| 2007/0205205 A1 | 9/2007 | Kliewer | |
| 2008/0093370 A1 | 4/2008 | Darsey | |
| 2008/0190948 A1 | 8/2008 | Sayasithsena | |
| 2009/0250467 A1 | 10/2009 | Schmidt | |
| 2009/0256043 A1 | 10/2009 | Lan | |
| 2010/0155550 A1 | 6/2010 | Weiss-Vons | |
| 2012/0287560 A1 | 11/2012 | Fan | |
| 2012/0329534 A1 | 12/2012 | Barnett et al. | |
| 2014/0171157 A1 | 6/2014 | Ho | |
| 2014/0326630 A1 | 11/2014 | Henry | |
| 2015/0230638 A1 | 8/2015 | Jagger | |
| 2015/0240862 A1 * | 8/2015 | Shi | F16M 13/022 248/205.8 |
| 2016/0258471 A1 | 9/2016 | Orban | |
| 2018/0149302 A1 | 5/2018 | Papapanos | |
| 2019/0022874 A1 | 1/2019 | Mutch et al. | |
| 2019/0024699 A1 | 4/2019 | Mutch et al. | |
| 2019/0203759 A1 | 7/2019 | Zimmerman | |
| 2019/0249709 A1 * | 8/2019 | Smith | F16M 13/005 |
| 2020/0232501 A1 | 7/2020 | McClean et al. | |
| 2020/0400267 A1 | 12/2020 | Garza | |
| 2021/0207647 A1 | 7/2021 | Liao | |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204291083 U | 4/2015 |
| CN | 204500194 U | 4/2015 |
| CN | 105996687 A | 10/2016 |
| CN | 106438659 A | 2/2017 |
| CN | 206060860 U | 3/2017 |
| CN | 207334187 U | 5/2018 |
| DE | 3742636 | 1/1989 |
| EP | 1649788 | 4/2006 |
| GB | 1534235 A | 11/1978 |
| JP | S4929371 U | 3/1974 |
| JP | H05187430 A | 7/1993 |
| JP | H0685924 U | 12/1994 |
| JP | 2000104724 A | 4/2000 |
| JP | 2003501315 | 1/2003 |

(56) References Cited

FOREIGN PATENT DOCUMENTS

| | | |
|---|---|---|
| JP | 2004160079 | 10/2004 |
| JP | 2006314739 | 11/2006 |
| JP | 2014173709 A | 9/2014 |
| KR | 20210104241 A | 8/2021 |
| WO | WO2012008942 | 1/2012 |
| WO | WO2019097212 A1 | 5/2019 |

* cited by examiner

VALVE-ACTUATED SUCTION APPARATUS

BACKGROUND

1. Field

The present disclosure relates to suction apparatus that can be releasably secured to surfaces. More particularly, the disclosure concerns suction apparatus with anchor members that adhere to surfaces by way of differential pressure when flexed. Still more particularly, the disclosure pertains to suction apparatus with quick-release differential pressure venting.

2. Description of the Prior Art

By way of background, suction apparatus that operate by way of differential pressure are known. Such apparatus often utilize resilient anchor members such as suction cups and suction seal stabilizers. A suction cup typically includes a flexible base seal member configured as an elastomeric dome-shaped structure having a concave lower side and a relatively soft peripheral rim. In order to adhere the suction cup to a reference surface, the base seal member must be affirmatively flexed by pressing it against the reference surface with enough force to temporarily flatten the concave lower side so that air is expelled outside the peripheral rim. When the pressing force is released, the base seal member has a natural tendency to return to its initial dome shape. As this rebounding occurs, the volumetric cavity that lies inside the peripheral rim between the base seal member's lower side and the reference surface begins to enlarge. This in turn causes the air pressure in the volumetric cavity to proportionally decrease in accordance with Boyle's Law. A pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the base seal member to its initial concave configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the base seal member's peripheral rim and the reference surface.

A suction seal stabilizer includes a base seal member that operates somewhat similarly to a suction cup's base seal member, but is typically less concave, or even flat, and usually made from a softer more resilient material. Alternatively, the base seal member of a suction seal stabilizer may be constructed with the same shape and material as a suction cup base seal member, but may be thinner and more flexible than its suction cup counterpart. When a properly designed suction seal stabilizer is placed on a reference surface, no pushing force needs to be applied to flatten the base seal member apart from the weight of the stabilizer itself and any items or materials that it carries. Such devices are thus generally self-sealing (self-anchoring) in a manner that is not noticeable to the user. Because the base seal member is usually highly flexible and may have little or no concavity, its elastic rebound forces may be relatively weak and generally insufficient to overcome the opposing gravitational forces bearing down on the suction seal stabilizer. If the base seal member remains substantially flat against the reference surface with little or no rebound occurring, the suction forces will be negligible or non-existent. In some designs, the suction seal stabilizer may even be capable of being moved laterally over the reference surface with little apparent resistance. On the other hand, large suction forces will be generated when an attempt is made to pull the suction seal stabilizer away from the reference surface, or tilt the stabilizer, such as by applying a side load against a suction apparatus that incorporates the stabilizer. This property of suction seal stabilizers is advantageous for certain applications, such as when the stabilizer is used in a suction apparatus designed to secure an object or material to a substantially horizontal reference surface. In that case, the suction apparatus can be moved laterally if a side load is applied sufficiently close to the reference surface, but will resist tipping when a side load or acceleration force is applied at higher elevations.

Some suction cups and suction seal stabilizers are designed so that they can only be removed from a reference surface by applying sufficient brute lifting force to break the seal formed by the base seal member's peripheral rim, or by peeling up the rim to create a small opening that vents the volumetric cavity. Other suction cups and suction seal stabilizers are designed with a vent port and are used with a mechanical stopper made of rigid material. The stopper is manually actuated into engagement with the vent port when it is desired to maintain suction, and is manually actuated out of engagement with the vent port when it is desired to break the suction. Existing stoppers for suction cups and suction cup stabilizers have associated disadvantages, including but not limited to design complexity, tendency toward inadvertent dislodgement resulting in base seal member detachment, and inability to vent unless completely separated from the vent port.

It is to improvements in the design of suction apparatus having anchor members embodied as suction cups or suction seal stabilizers that the present disclosure is directed.

SUMMARY

A valve-actuated suction apparatus includes an anchor member formed of a non-porous resilient material. The anchor member includes a flexible base seal member having a seal member outer side, a seal member inner side, and a seal member peripheral edge defining an outer periphery of the seal member. The seal member inner side is configured to form a substantially airtight seal with the reference surface that defines a controlled pressure zone capable of maintaining a negative pressure differential relative to the area of ambient pressure outside the controlled pressure zone. The controlled pressure zone represents a region located between the seal member inner side and the reference surface. The anchor member further includes an anchor member stem having a stem base end disposed on the seal member and a stem free end spaced from the stem base end. A vent port extends through the anchor member stem. The vent port includes a first vent port section and a second vent port section. The first vent port section is disposed in relative proximity to the stem base end and the second vent port section is disposed in relative proximity to the stem free end. A vent port internal shoulder is defined at an outer end of the first vent port section, facing toward the stem base end.

A plunger valve is operable to selectively seal and unseal the vent port. The plunger valve includes a plunger valve stem and a plunger valve head. The plunger valve stem is slidably disposed in the vent port and slidable between a closed position of the plunger valve wherein the vent port is sealed and an open position of the plunger valve wherein the vent port is unsealed. The plunger valve stem has a first valve stem section and a second valve stem section. The first valve stem section includes a valve stem stabilizer configured to engage a sidewall of the first vent port section in at least the closed position of the plunger valve, and to block against the vent port internal shoulder in the open position of the plunger valve in order to prevent removal of the plunger valve from the vent port during normal operation of the suction apparatus. The first valve stem section further includes an air bypass neck that resides at least partially in the first vent port section when the plunger valve is in the closed position, and extends through the second vent port section when the plunger valve is in the open position. The air bypass neck is configured to channel air through the second vent port section when the plunger valve is in the open position. The second valve stem section includes a vent port stopper configured to plug the second vent port section when the plunger valve is in the closed position in order to prevent the passage of air through the vent port.

In the closed position of the plunger valve, the vent port stopper plugs the second vent port section and the valve stem stabilizer maintains contact with the sidewall of the first vent port section. In the open position of the plunger valve, the vent port stopper is retracted from the second vent port section, the valve stem air bypass neck extends through the second vent section to channel air therethrough, and the valve stem stabilizer engages the vent port internal shoulder. When the plunger valve is pushed into the closed position while the seal member is pressed against the reference surface, the seal member inner side will seal against the reference surface to establish and seal the controlled pressure zone, thereby rendering it airtight in order to maintain a negative pressure differential relative to the area of ambient pressure outside the controlled pressure zone. When the plunger valve is pulled out to the open position while the seal member is attached to the reference surface, the seal member will detach from the reference surface due to the controlled pressure zone being vented, thereby releasing the negative pressure differential relative to the area of ambient pressure outside the controlled pressure zone.

In another aspect, a method of using a valve-actuated suction apparatus, as summarized above, includes (in no particular order) (1) positioning the anchor member so that the seal member is in contact with the reference surface, (2) actuating the plunger valve to assume or maintain the closed position while flattening the seal member (as necessary) against the reference surface to establish and seal the controlled pressure zone, thereby rendering it airtight in order to maintain a negative pressure differential relative to the area of ambient pressure outside the controlled pressure zone, and (3) actuating the plunger valve to the open position while the seal member is attached to the reference surface to detach the seal member from the reference surface due to the controlled pressure zone being vented, thereby releasing the negative pressure differential relative to the area of ambient pressure outside the controlled pressure zone.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1:
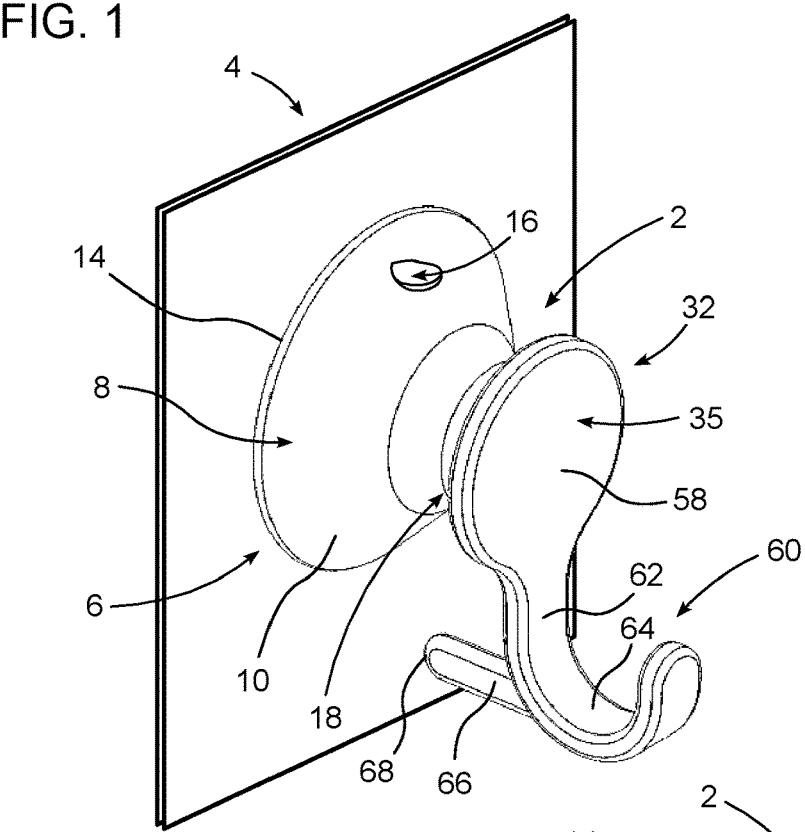
FIG. 1 is a rear perspective view showing a valve-actuated suction apparatus according to an example embodiment, with the suction apparatus attached to a reference surface.
Figure 2:
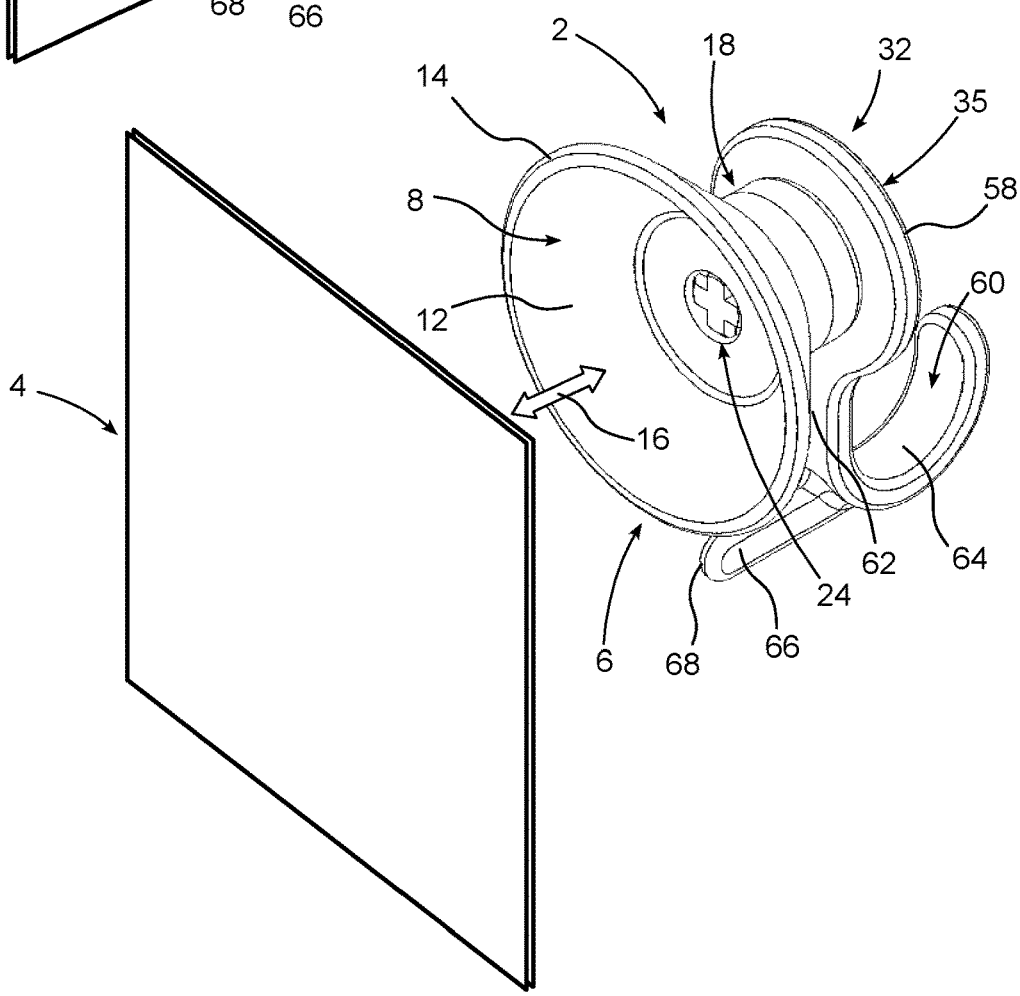
FIG. 2 is a front perspective view showing the suction apparatus of FIG. 1 detached from the reference surface.

Turning now to the drawing figures, in which like reference numbers illustrate like structure in all of the several views, FIGS. 1-2 illustrate one possible embodiment a valve-actuated suction apparatus 2 that may be constructed in accordance with the present disclosure. The suction apparatus 2 may be used for various applications, including to hold or carry one or more items or materials. Advantageously, the suction apparatus 2 provides a quick-release and attachment capability that allows the apparatus to be secured to a reference surface 4 and quickly released therefrom as needed. Although the reference surface 4 is shown as being substantially vertical (such as a wall, door, window, etc.), it could also be substantially horizontal (such as a table or countertop). The reference surface 4 could also have an orientation lying somewhere between vertical and horizontal.

In the illustrated embodiment, the suction apparatus 2 includes an anchor member 6 formed of a non-porous resilient material, such as injection-molded silicone rubber having a suitable hardness and density. Depending on the application for which the suction apparatus 2 will be used, the anchor member 6 may be designed as a suction cup or a suction seal stabilizer. As discussed in the Background section above, suction cups and suction seal stabilizers operate somewhat differently from each other, and have different features and advantages.

Figure 18:
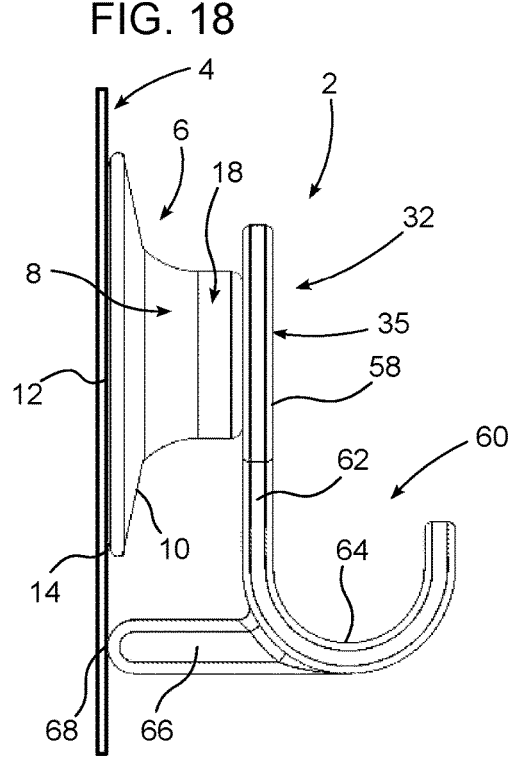
FIG. 18 is a side elevation view of the suction apparatus of FIG. 1 in sealing engagement with a reference surface and with a plunger valve thereof in a closed sealing position.

The anchor member 6 includes a flexible (resiliently deformable) base seal member 8 having a seal member outer side 10 (FIG. 1), a seal member inner side 12 (FIG. 2), and a seal member peripheral edge 14 defining an outer periphery of the seal member. In some anchor member designs, the seal member 8 may be inherently formed with a substantially non-flat, dome-like configuration wherein the seal member outer side 10 is convex and the seal member inner side 12 is concave. In such designs, pressing the seal member peripheral edge 14 against the reference surface 4 with sufficient force will resiliently deform the seal member 8 so as to temporarily bias it into a flattened (partially or wholly) configuration. A flattened configuration of the seal member 8 is shown in FIG. 1, and is further illustrated in FIG. 18 (described in more detail below). In other anchor member designs, the seal member 8 may be inherently formed with a substantially flat configuration, and may thus appear as shown in FIGS. 1 and 18 prior to the seal member peripheral edge 14 being pressed against the reference surface, or after being pressed but with very little force being required. Regardless of the anchor member's design, the seal member inner side 12 is designed to seal against the reference surface 4 when engaged thereto with the seal member 8 being flattened or flat. This sealing engagement defines a controlled pressure zone 16 (FIG. 1) that is capable of maintaining a negative pressure differential relative to the area of ambient pressure outside the controlled pressure zone. The controlled pressure zone 16 represents the region located inside the seal member peripheral edge 14, between the seal member inner side 12 and the reference surface 4 (FIG. 2).

Figure 3:
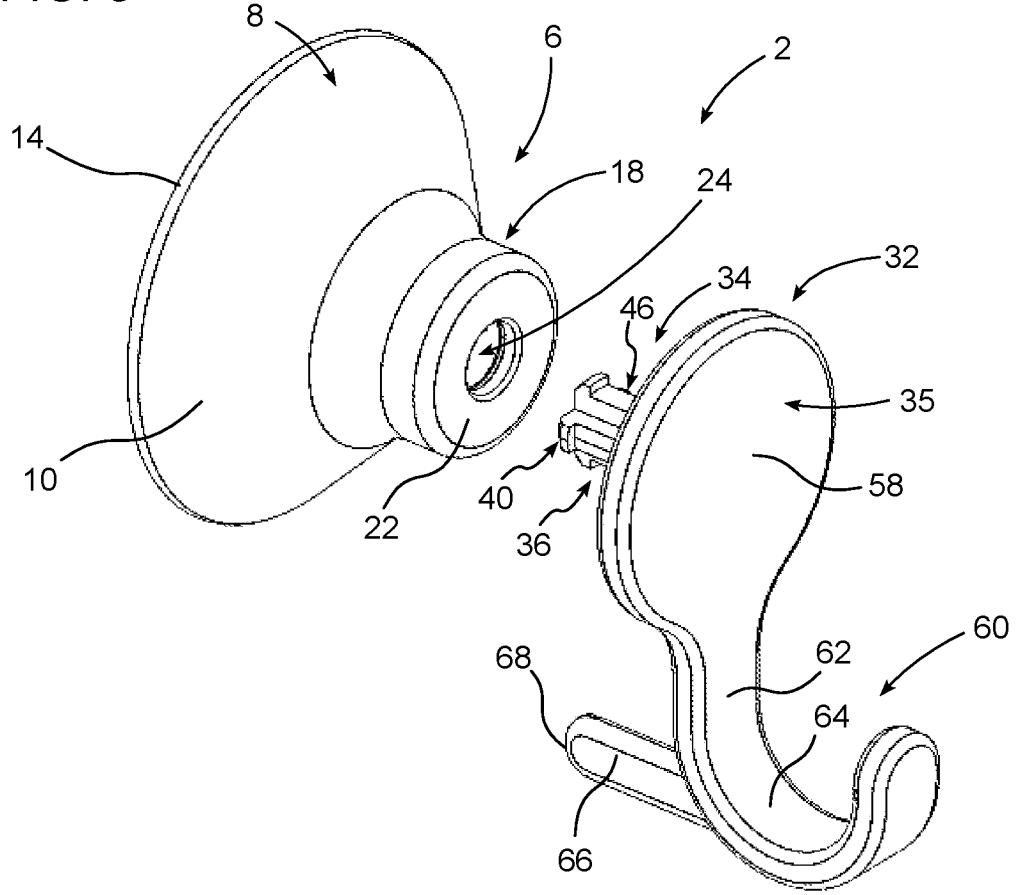
FIG. 3 is an exploded rear perspective view showing the suction apparatus of FIG. 1.
Figure 4:
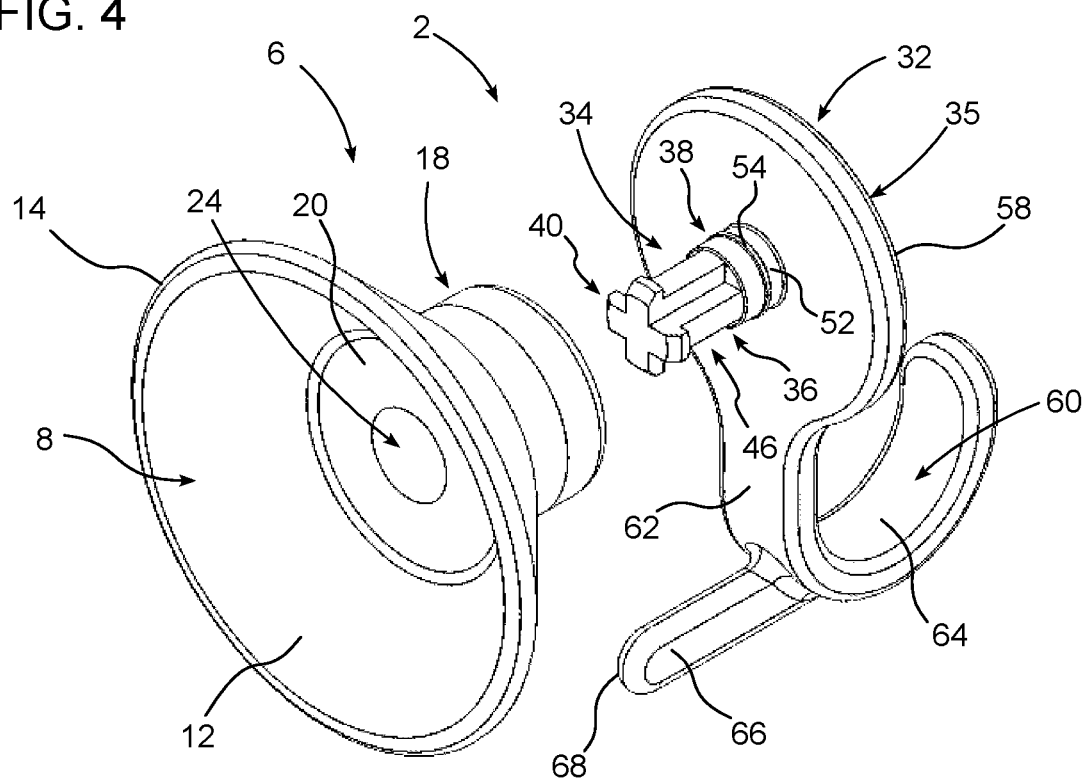
FIG. 4 is an exploded rear perspective view showing the suction apparatus of FIG. 1.

With additional reference to FIGS. 3-4, the anchor member 6 further includes an anchor member stem 18 having a stem base end 20 (FIG. 4) disposed on the seal member 8 and a stem free end 22 (FIG. 3) spaced from the stem base end. A vent port 24 extends through the anchor member stem 18. As additionally shown in FIGS. 5-6, the vent port 24 includes a first vent port section 26 and a second vent port section 28. The first vent port section 26 is disposed in relative proximity to the stem base end 20 and the second vent port section 28 is disposed in relative proximity to the stem free end 22. A vent port internal shoulder 30 is defined at an outer end of the first vent port section 26, facing toward the stem base end 20.

Figure 9:
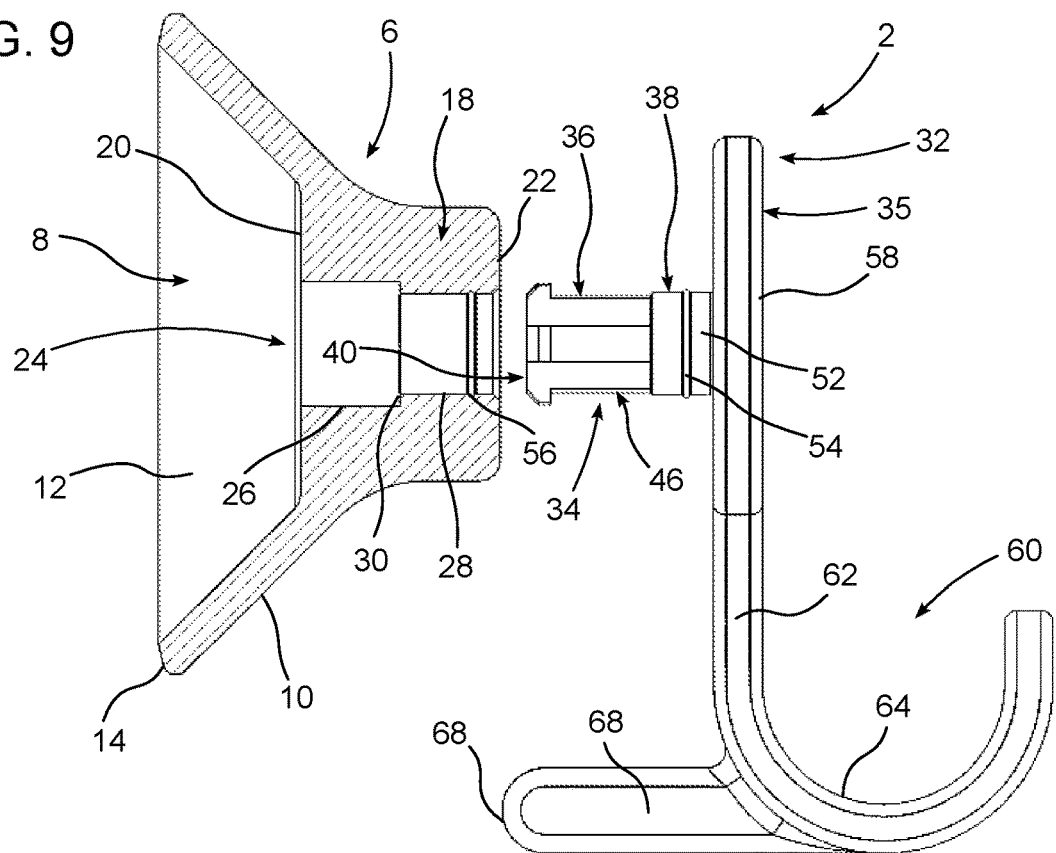
FIG. 9 is a side elevation view of the suction apparatus of FIG. 1, with an anchor member thereof being shown cross-sectionally along its central longitudinal axis, and with a plunger valve thereof being disassembled from the suction cup.
Figure 10:
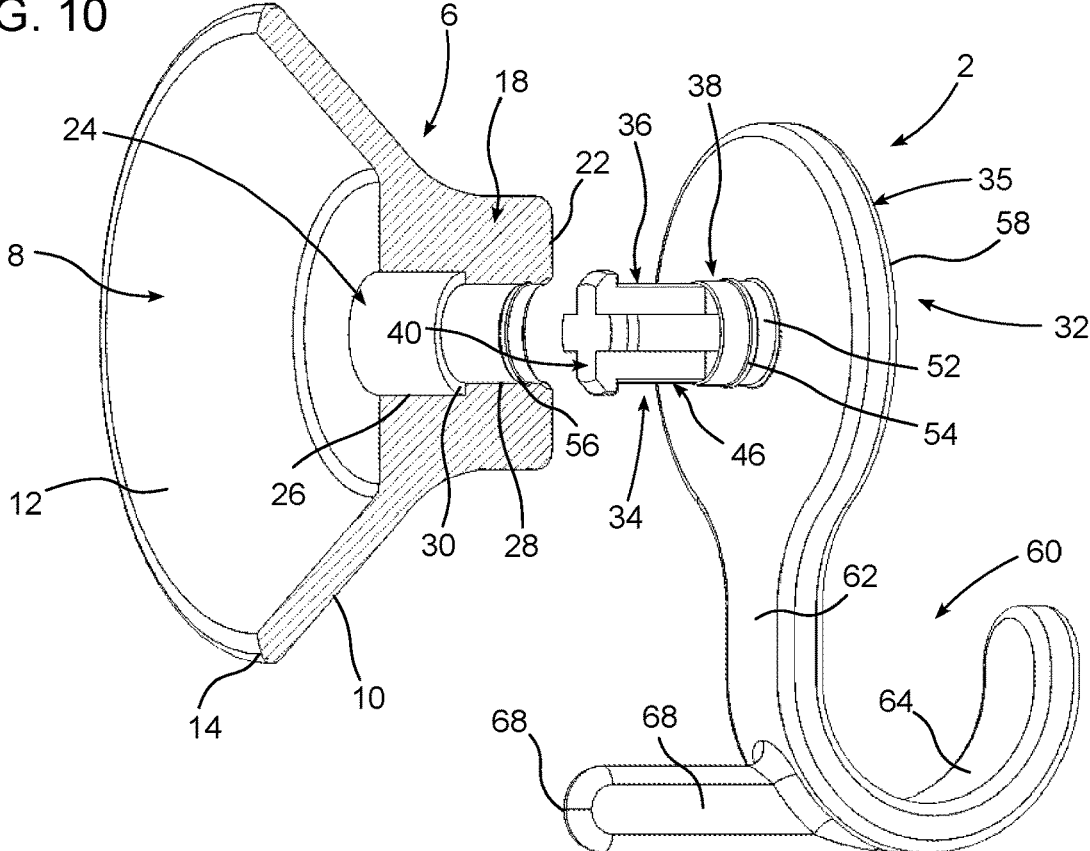
FIG. 10 is a front perspective view of the suction apparatus of FIG. 1, with an anchor member thereof being shown cross-sectionally along its central longitudinal axis, and with a plunger valve thereof being disassembled from the suction cup.

As shown in FIGS. 1-4, the suction apparatus 2 includes a plunger valve 32 that is operable to selectively seal and unseal the vent port 24. The plunger valve 32 may be formed from a material that is more rigid than the anchor member 6, such as injection-molded hard plastic or rubber material. As can be seen in FIGS. 2-3, the plunger valve 32 includes a plunger valve stem 34 and a plunger valve head 35. As additionally shown in FIGS. 5-10, the plunger valve 3 stem 34 is slidably disposed in the vent port 24 for linear (longitudinal) displacement and movement between a closed position of the plunger valve (FIGS. 5-6) wherein the vent port is sealed, and an open position of the plunger valve (FIGS. 7-8) wherein the vent port is unsealed. In order to disassemble the suction apparatus 2 for cleaning or the like, the plunger valve 32 may be displaced beyond the open position to a disassembly position (FIGS. 9-10) wherein the plunger valve is completely separated from the anchor member 6.

In the illustrated embodiment, both the vent port 24 and the plunger valve stem 34 have a circular cross-sectional configuration. This allows the plunger valve stem 34 to rotate within the vent port 24. If it is desired to prevent such rotation, the vent port 24 and the plunger valve stem 34 could each be configured with a non-circular configuration, or a circular configuration with an anti-rotation feature such as a key-and-keyway arrangement.

As can be seen in each of FIGS. 3-10, the plunger valve stem 34 is formed with a first valve stem section 36 and a second valve stem section 38. With additional reference to FIG. 11, the first valve stem section 36 includes a transverse valve stem stabilizer 40 that may be formed at the inner end thereof. The valve stem stabilizer 40 is configured to engage at least two opposing sidewall surfaces of the first vent port section 26 when the plunger valve is in the closed position. This stabilizes the plunger valve stem 34 against unwanted transverse rocking when the plunger valve is in the closed position. For reasons that will become apparent, such rocking could cause inadvertent venting of the controlled pressure zone 16 during use of the suction apparatus 2.

In the illustrated embodiment, the valve stem stabilizer 40 additionally serves as a valve stem slide control guide that limits transverse displacement of the plunger valve stem 34 as the plunger valve 32 displaces longitudinally between its closed and open positions. It does this by continuously slidably engaging the at least two opposing sidewall surfaces of the first vent port section 26 along the entire length of that section. In the illustrated embodiment, all sidewall surface regions of the first vent port section 26 extend axially parallel to each other, but this is not necessarily a design requirement.

Figure 7:
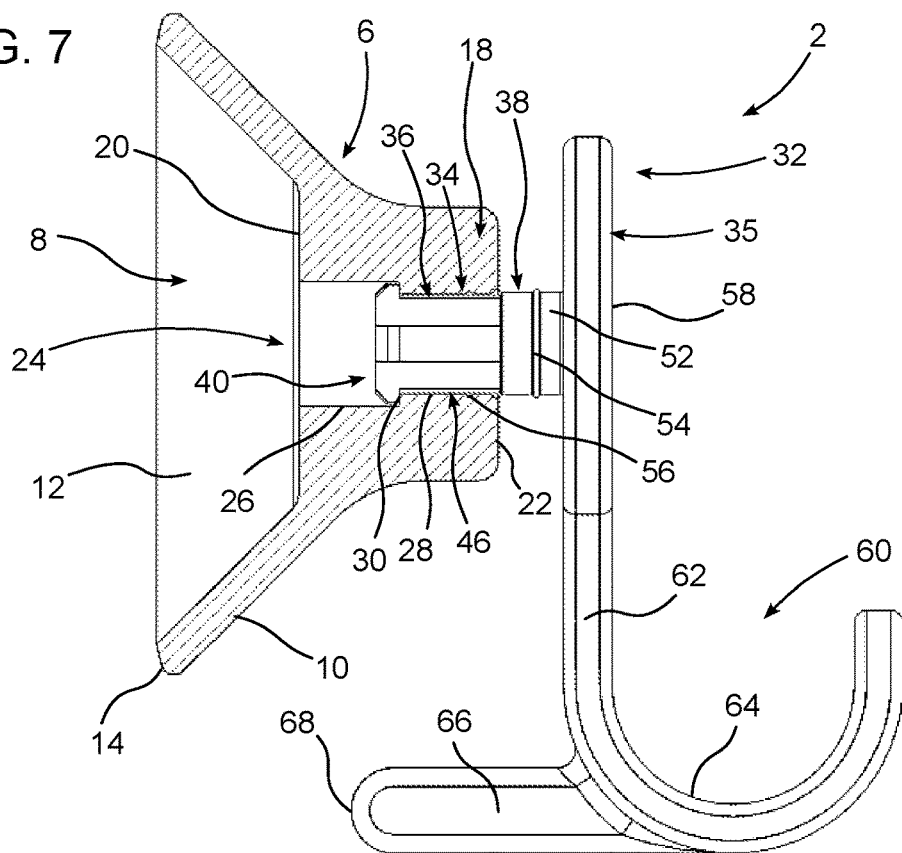
FIG. 7 is a side elevation view of the suction apparatus of FIG. 1, with an anchor member thereof being shown cross-sectionally along its central longitudinal axis, and with a plunger valve thereof being in an open venting position.
Figure 8:
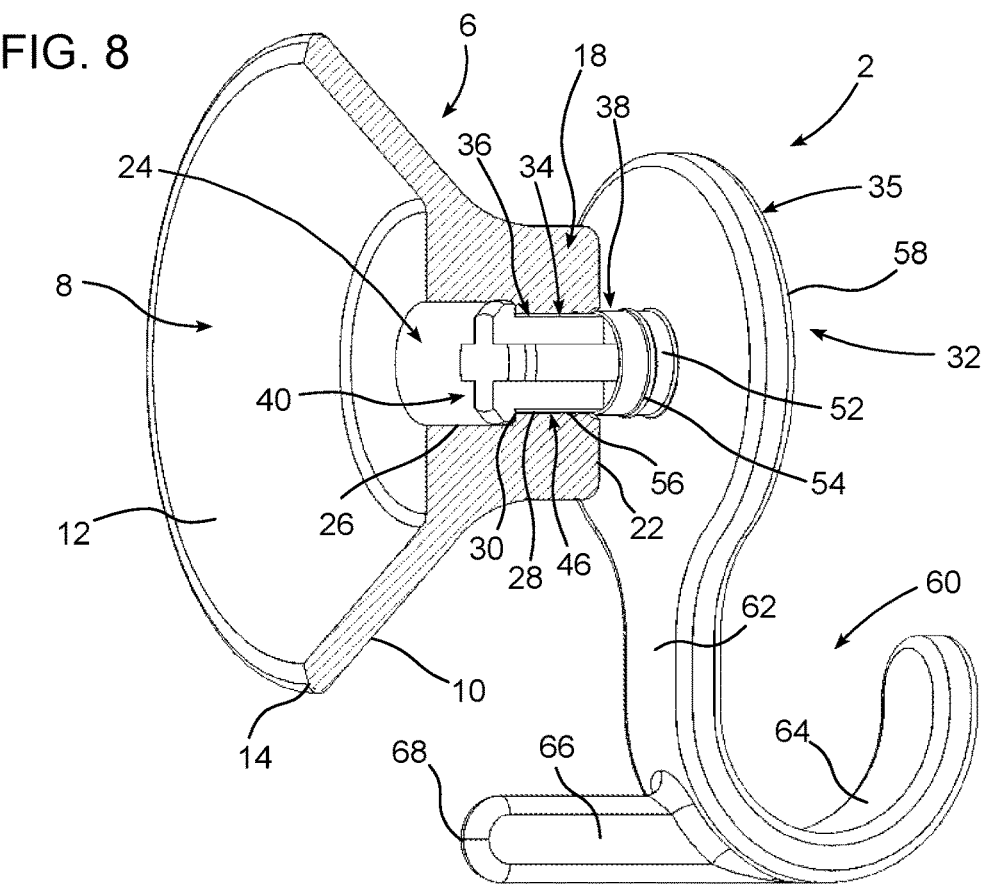
FIG. 8 is a front perspective view of the suction apparatus of FIG. 1, with an anchor member thereof being shown cross-sectionally along its central longitudinal axis, and with a plunger valve thereof being in an open venting position.

As can be seen in FIGS. 7-8, the valve stem stabilizer 40 also blocks against the vent port internal shoulder 30 after the plunger valve 32 slides from the closed position and reaches the open position. The valve stem stabilizer 40 thus serves as a plunger valve axial displacement limiter that prevents removal of the plunger valve 32 from the vent port 24 during normal operation of the suction apparatus 2.

Figure 11:
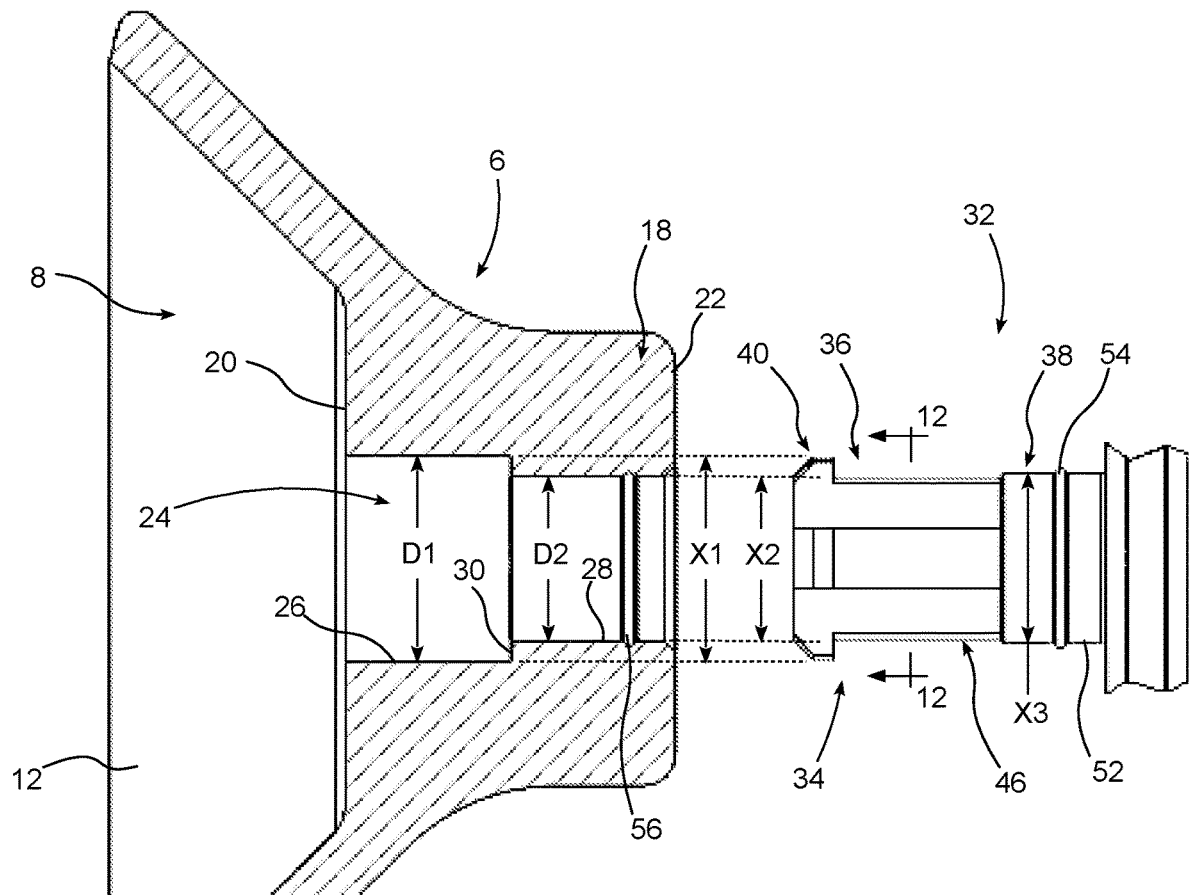
FIG. 11 is a partial cross-sectional and partial side elevation view of the suction apparatus of FIG. 1 in a disassembled state, with an anchor member thereof being shown cross-sectionally along its central longitudinal axis and a portion of a plunger valve thereof being shown in side elevation.
Figure 12:
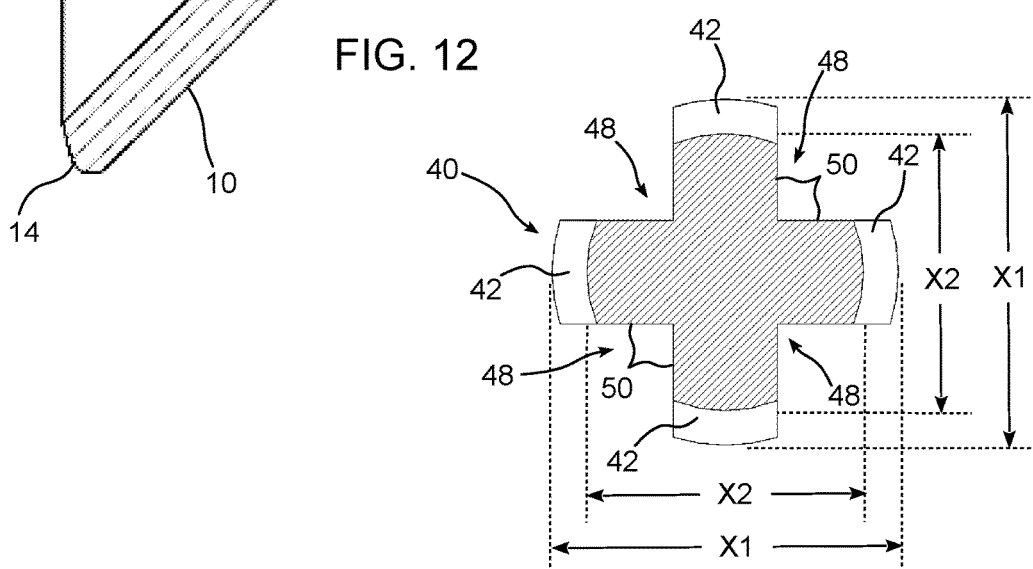
FIG. 12 is a cross-sectional view taken along like 12-12 in FIG. 11.

With additional reference now to FIG. 12, the valve stem stabilizer 40 may include a set of four transversely-protruding valve stem guide prongs 42 that are sized to lightly engage the sidewall of the first vent port section 26. The four transverse guide prongs 42 may be arranged 90 degrees apart so as to thereby prevent valve stem transverse rocking in two dimensions. Additional transverse guide prongs 42 may also be used in order to further stabilize the plunger valve stem 34 against transverse rocking. If the opposing sidewall surfaces engaged by the transverse guide prongs 42 are separated by a transverse dimension "D1" (as shown in FIG. 11), the valve stem stabilizer 40 may have a transverse dimension "X1" across any opposing pair of transverse guide prongs 42 (as shown in FIGS. 11 and 12) that is equal to or slightly less than "D1."

Figure 5:
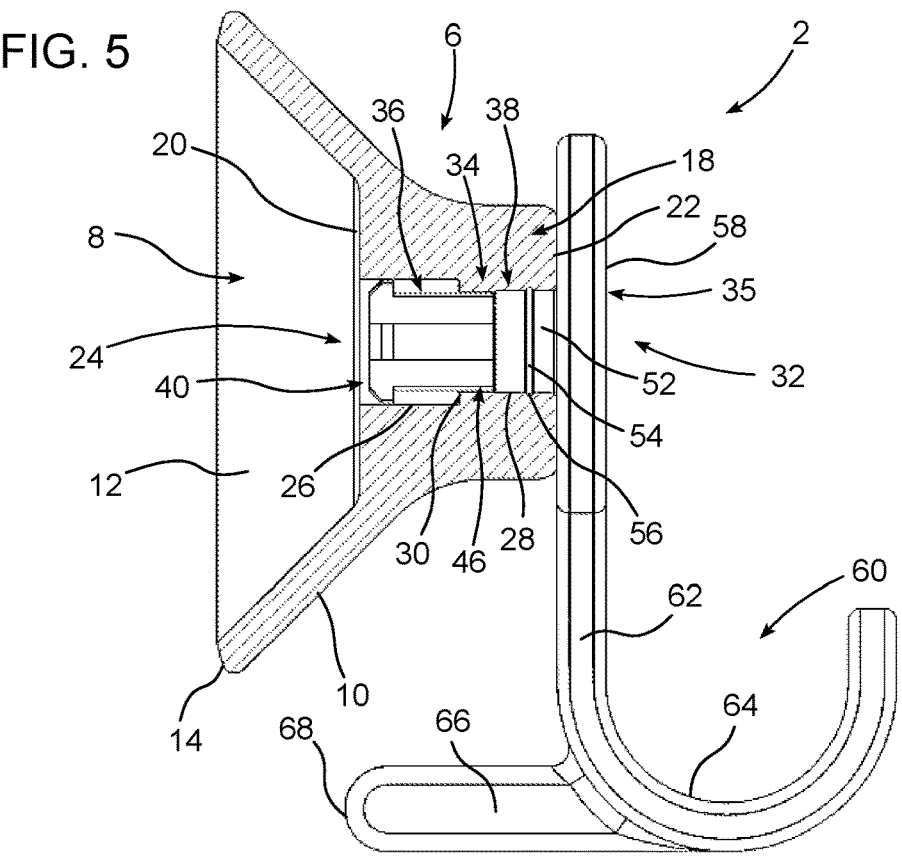
FIG. 5 is a side elevation view of the suction apparatus of FIG. 1, with an anchor member thereof being shown cross-sectionally along its central longitudinal axis, and with a plunger valve thereof being in a closed sealing position.
Figure 6:
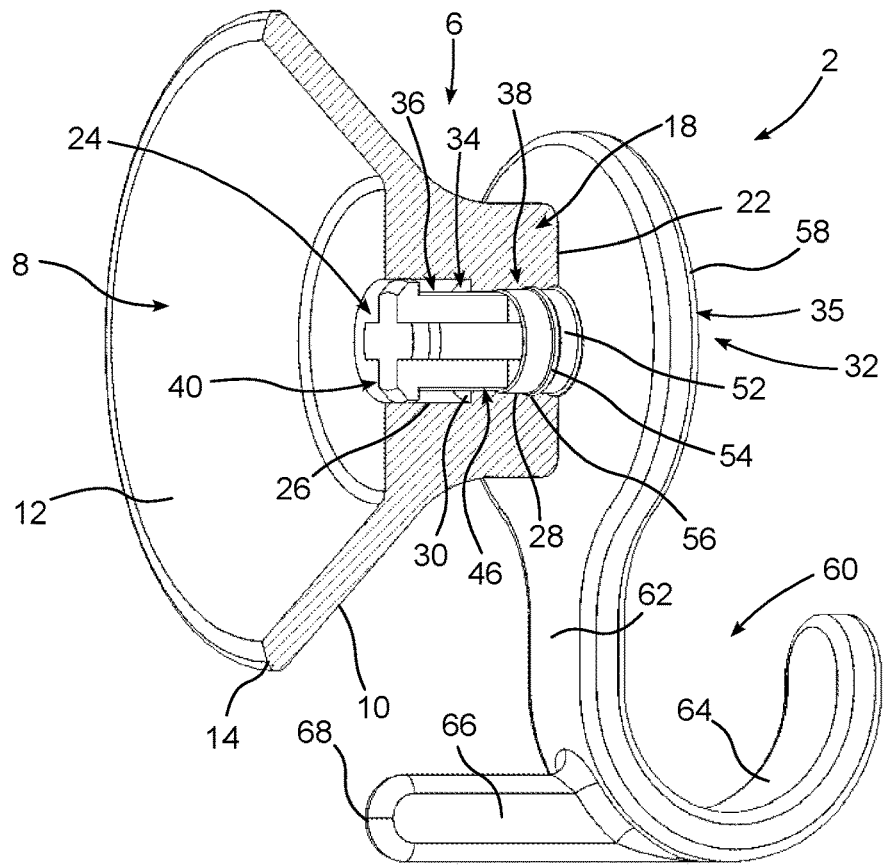
FIG. 6 is a front perspective view of the suction apparatus of FIG. 1, with an anchor member thereof being shown cross-sectionally along its central longitudinal axis thereof, and with a plunger valve thereof being in a closed sealing position.
Figure 13:
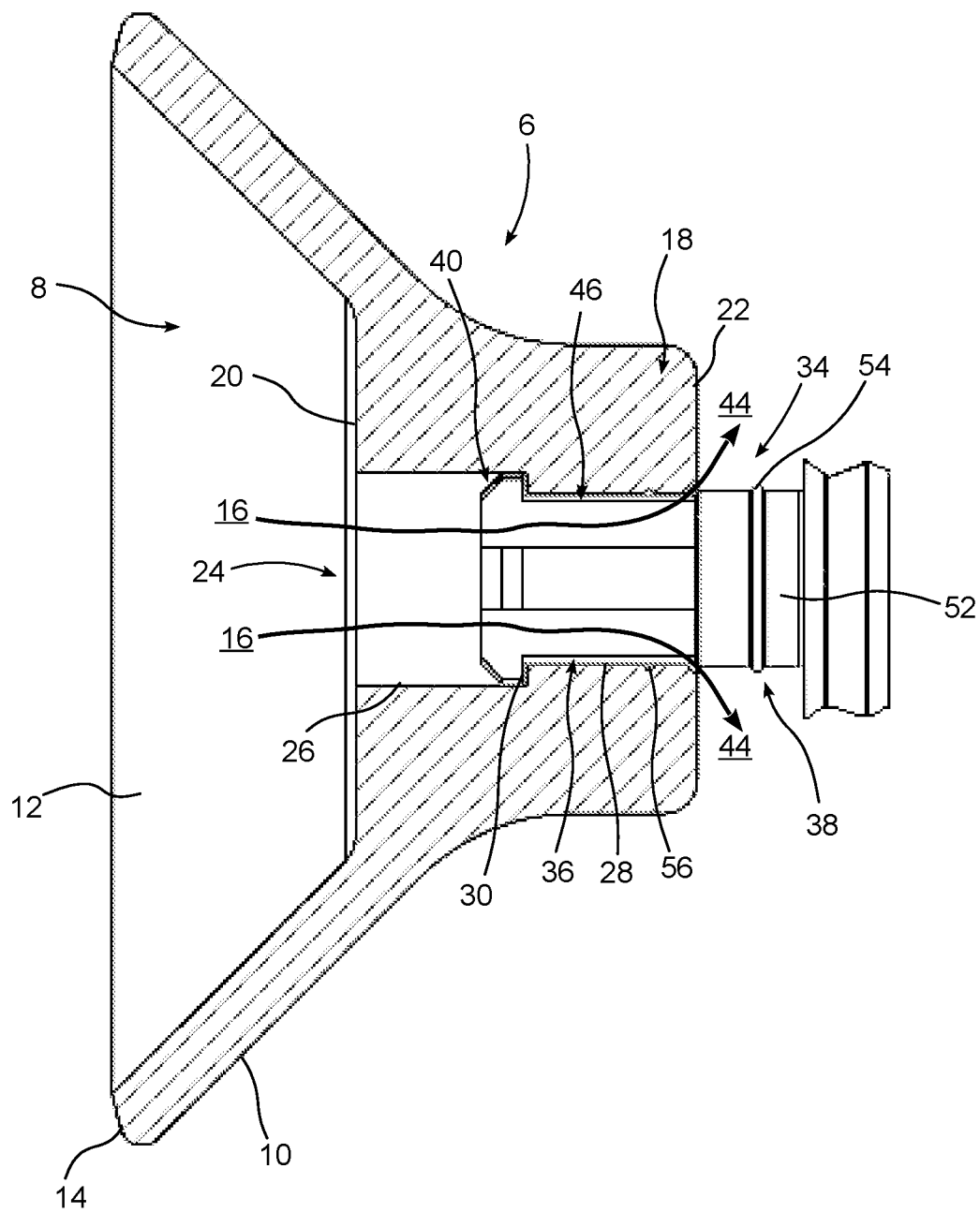
FIG. 13 is a partial cross-sectional and partial side elevation view of the suction apparatus of FIG. 1 in an open position, with an anchor member thereof being shown cross-sectionally along its central longitudinal axis and a portion of a plunger valve thereof being shown in side elevation.

With continuing reference to FIGS. 3-12, the first valve stem section 36 further includes an air bypass neck 44. As can be seen in FIGS. 5-6, the air bypass neck 44 resides at least partially in the first vent port section 26 when the plunger valve 32 is in the closed position, and may also partially extend into the second vent port section 28. The air bypass neck 44 passes further into the second vent port section 28 as the plunger valve 32 displaces to the open position. As can be seen in FIGS. 7-8, the air bypass neck 44 extends completely through the second vent port section 28 when the plunger valve 32 reaches the open position. In the open position, the air bypass neck 44 is configured to channel air through the second vent port section 28 so as to vent the controlled pressure zone 16 through the vent port 24. FIG. 13 depicts the full venting pathway from the controlled pressure zone 16 on the inner side 12 of the base seal member 8 to an area of ambient pressure 46 outside the suction apparatus 2.

The air bypass neck 46 may include one or more axial air flow pathways on the first valve stem section 26. As shown in FIG. 12, the axial air flow pathways may be implemented as axial channels 48 (e.g., flutes) defined by protruding longitudinal flanges 50 on the first valve stem section 26. By way of example, FIG. 12 depicts four longitudinal flanges 50 on the first valve stem section 26 that define four axial channels 48 to provide the one or more axial air flow pathways of the first valve stem section. As can also be seen in FIGS. 11 and 12, the previously described transverse guide prongs 42 of the valve stem stabilizer 40 may be formed as localized prongs that extend transversely from the longitudinal flanges 50 at the inner end of the first valve stem section 26. If desired, the inner faces of the transverse guide prongs 42 may be tapered to facilitate insertion of the plunger valve stem 34 into the vent port 24.

The longitudinal flanges 50 that define the axial channels 48 of the air bypass neck 44 will typically be spaced from the sidewall surfaces of the first vent port section 26. Although not a requirement, the longitudinal flanges 50 may also be spaced from the sidewall surfaces of the second vent port section 28. As previously described, the first vent port section 26 may have a transverse dimension "D1." As can be seen in FIG. 11, the second vent port section 28 may have a transverse dimension "D2" that is smaller than "D1." The difference between "D1" and "D2" may be used to define the vent port internal shoulder 30 (e.g., as an annular surface). The air bypass neck 4446 may have a transverse dimension "X2" across any opposing pair of transverse longitudinal flanges 50. In the illustrated embodiment, the dimension "X2" is less than the transverse dimension "X1" associated with the transverse guide prongs 42 of the valve stem stabilizer 40.

In the illustrated embodiment, the dimension "X2" is less than the transverse dimension "D1" of the first vent port section 26. The dimension "X2" may also be less than the transverse dimension "D2" associated with the second vent port section 28. As described in more detail below, this facilitates removal of the plunger valve stem 34 from the vent port 24 because the longitudinal flanges 50 do not engage the sidewall surfaces of the second vent port section 28, and will therefore not create frictional resistance to plunger valve displacement. In addition, as shown in FIG. 13, sizing the longitudinal flanges 50 so that they are spaced from the sidewall surfaces of the second vent port section 28 provides some measure of venting of the controlled pressure zone 16 when the plunger valve 32 reaches the open position. Thus, in an embodiment, the axial air flow pathways provided by the axial channels 48 of the air bypass neck 44 could be potentially eliminated or reduced in size, particularly if a small gap is provided between the sidewall surfaces of the first vent port section 26 and the valve stem stabilizer 40 (i.e., such that X1<D1) so that air can easily bypass around the entirety of the plunger valve stem 34.

As best shown in FIG. 11, the second valve stem section 38 may be formed as an enlarged vent port stopper 52 configured to plug and seal the second vent port section 28 when the plunger valve 32 is in the closed position in order to prevent the passage of air through the vent port 24. To provide the required sealing, the vent port stopper 52 should have the same cross-sectional shape as the second vent port section 28. In order to further ensure good sealing, the vent port stopper 52 may be cross-sectionally larger than the second vent port section 28 so as to create an interference fit when the vent port stopper engages the second vent port section with the plunger valve 32 in the closed position. To create the interference fit, the vent port stopper 52 may have a transverse dimension "X3" that is slightly larger than the transverse dimension "D2" of the second vent port section 28. In the illustrated embodiment, the vent port stopper 52 and the second vent port section 28 each have a circular cross-section. As such, the dimensions "X3" and "D2" are diameters, and the "X3" diameter of the vent port stopper 52 is larger than the "D2" diameter of the second vent port section 28. For embodiments where the cross-sectional shapes of the vent port stopper 52 and the second vent port section 28 are not symmetrical, such that the dimensions "X3" and "D2" are not uniform in all transverse directions, an interference fit may be established by making "X3" larger than "D2" in one or more transverse directions.

One advantage of providing an interference fit between the vent port stopper 52 and the second vent port section 28 is to resist inadvertent opening of the plunger valve 32 and consequent venting of the controlled pressure zone 16. The likelihood of unwanted venting may also be reduced by forming the vent port stopper 52 with sufficient axial length to require a predetermined amount of axial displacement when opening the plunger valve 32 before the vent port stopper clears the second vent port section and vents the controlled pressure zone 16.

In addition to or in lieu of forming the vent port stopper 52 to provide an interference fit with the second vent port section 28, the vent port stopper may be formed with a protruding transverse lock flange 54 that engages a corresponding transverse lock channel 56 in the second vent port section when the plunger valve 32 is in the closed position. The lock flange 54 and the lock channel 56 provide an interlock mechanism that serves to fix the plunger valve 32 in the closed position. Because the vent port stopper 52 and the second vent port section 28 each have a circular cross-section in the illustrated embodiment, the transverse flange 54 may be formed as a circular ring and the transverse channel 56 may be formed as a circular groove.

Summarizing the foregoing discussion of the vent port stopper 52, it will be appreciated that resistance to inadvertent plunger valve opening may be provided by designing the vent port stopper so that it includes either (1) a cross-section that is larger than a cross-section of the second vent port section 28 so as to create an interference fit when the vent port stopper engages the second vent port section with the plunger valve 32 in the closed position, or (2) a protruding transverse lock flange 54 that engages a corresponding transverse lock channel 56 in the second vent port section when the vent port stopper engages the second vent port section with the plunger valve is in the closed position. Alternatively, both of both of features (1) and (2) may be used in the suction apparatus 2.

As shown in FIGS. 1-10, the plunger valve head 35 is disposed outside the vent port 24. It acts as an external valve-actuating member 58 and may be formed as a thumb-engagement pad that enables a user to easily manipulate the plunger valve head 35 in order to pull and push the plunger valve 32 between its closed and open positions. As shown in FIGS. 5 and 6, the plunger valve 32 may be formed so that the valve actuating member 58 engages the free end 22 of the anchor member stem 18 when the plunger valve is pushed into the closed position. The valve actuating member 58 may thus serve as a stop that limits inward displacement of the plunger valve 32 to define the closed position, just as the valve stem stabilizer 40 limits outward displacement of the plunger valve to define the open position. The plunger valve head 35 will also aid in anchoring the suction apparatus 2 by engaging the stem 18 and transferring pushing force onto the anchor member 6 in order to flatten the seal member 8 against the reference surface 4 should it be necessary to apply such pushing force.

Depending on the application for which the suction apparatus 2 will be used, the plunger valve head 35 and/or some portion of the anchor member 6 (such as the stem 18) may be formed with or mounted to an auxiliary structure designed and operable to carry an object or material that is to be anchored the reference surface 4, or which itself represents the object or material to be anchored, with the auxiliary structure being selected according to whether the reference surface is vertical, horizontal, or somewhere in between.

In the illustrated embodiment of FIGS. 1-10, wherein the reference surface 4 is substantially vertical (or otherwise non-horizontal), the auxiliary structure may include a generally J-shaped carrier hook 60 having a downwardly-depending carrier hook leg section 62 and a generally U-shaped carrier hook trough section 64. The carrier hook leg section 62 may depend downwardly from the valve-actuating member 58 of the plunger valve head 35. As additionally shown in FIG. 14, the carrier hook trough section 64 may be formed at the bottom of the carrier hook leg section 62 and extend outwardly away from the reference surface 4 when the suction apparatus 2 is mounted thereto. The carrier hook trough section 64 could also face toward the reference surface 4 is so desired. During use of the suction apparatus 2, the carrier hook 60 may hold an object or material, such as an article of clothing (not shown) that is to be hung from a door, wall or other substantially vertical structure.

Figure 14:
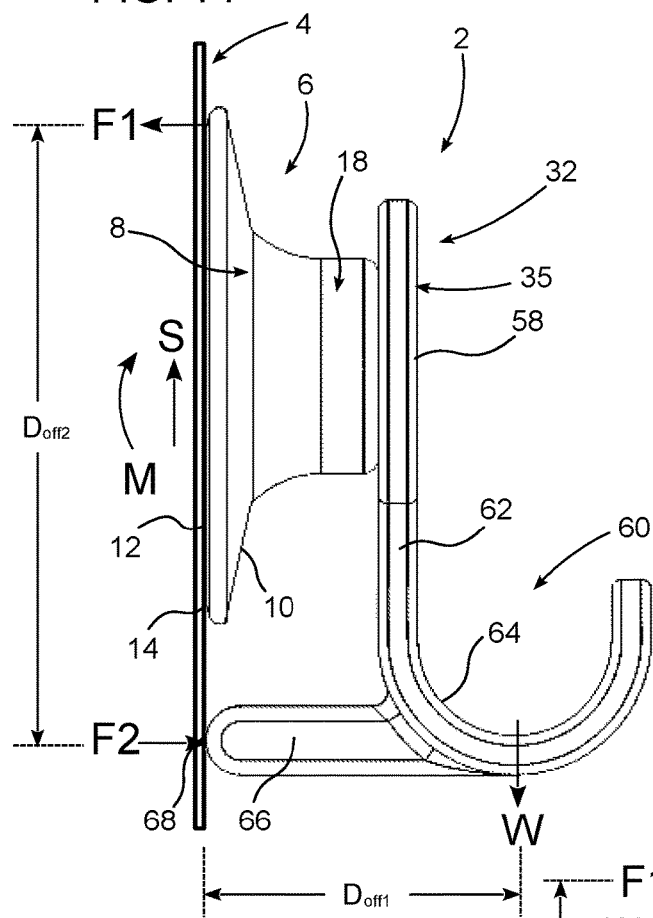
FIG. 14 is a side elevation view of the suction apparatus of FIG. 1 engaging a reference surface with a plunger valve thereof in a closed sealing position, and with an anti-rotation stabilizer thereof engaging the reference surface.

If desired, the back side of the carrier hook 60 (i.e., the side that faces the reference surface 4) may be formed with an an optional anti-rotation stabilizer 66 that is sized and configured to engage the reference surface 4 when the suction apparatus 2 is attached thereto with the seal member 8 in its sealed condition. This is shown in FIGS. 1 and 14. The anti-rotation stabilizer 66 may be configured as a transverse strut that extends from the back (closed) side of the carrier hook trough section 64 toward the reference surface 4 and away from the front (open) side of the trough section that carries an object to be held. In this configuration, the anti-rotation stabilizer 66 extends generally perpendicular to the reference surface 4 at a height which is below the seal member 8, such that a free end thereof forms a tip 68 that engages the reference surface below the seal member. It will be appreciated that other embodiments of the anti-rotation stabilizer 66 could have different structural configurations, some of which may fall into the strut category, while others do not.

As shown in FIG. 14, when the suction apparatus 2 is mounted to the reference surface 4 and the carrier hook 60 carries an object, the weight "W" of the object will apply a downward load to the carrier hook trough section 64. This downward load is reacted by the carrier hook leg section 62 and transferred to the plunger valve head 35, and then carried by the plunger valve 32 through the anchor member stem 18 to the base seal member 8, and applied to the reference surface 4 by the seal member inner side 12, usually proximate to the seal member peripheral edge 14. Assuming the reference surface 4 is substantially vertical, the downward object weight "W" is reacted at the reference surface 4 by an equal and opposite shearing force "S" that acts upwardly on the seal member inner side 12.

Because the object weight "W" is applied at an offset distance "$D_{off1}$" from the reference surface 4, a pivot-inducing moment "M" of magnitude $W*D_{off1}$ will be applied to the suction apparatus 2. The pivot-inducing moment "M" will be reacted at the reference surface 4 by a counteracting moment produced by a pair of equal and opposite coupling forces "F1" and "F2" of magnitude "F," separated by an offset distance "$D_{off2}$." In FIG. 14, the coupling force "F1" represents a tensile force that is distributed in some fashion around the upper portion of the seal member inner side 12, such as near the upper region of the seal member peripheral edge 14. The coupling force "F1" is seen by the seal member 8 as a pulling force tending to separate the seal member inner side 12 away from the reference surface 4. This force is resisted by the pressure differential inside the controlled pressure zone 16. The coupling force "F2" represents a compressive force that is applied to the tip 68 of the anti-rotation stabilizer 66, which is below the seal member 8.

In order for the suction apparatus 2 to maintain static balance, the counteracting moment generated by the equal and opposite coupling forces "F1" and "F2" of magnitude "F," acting at the coupling distance "$D_{off2}$," must be equal to the pivot-inducing moment "M" applied by the object weight "W" acting at the offset distance Doffs. In other words, $(F*D_{off2})=M=(W*D_{off1})$. The amount of weight "W" that can be carried by the suction apparatus 2 anchor member 6 is therefore dependent on the ability of the anchor member 6 to withstand the coupling forces "F1" and "F2" without the seal member 8 separating from the reference surface 4.

Figure 15:
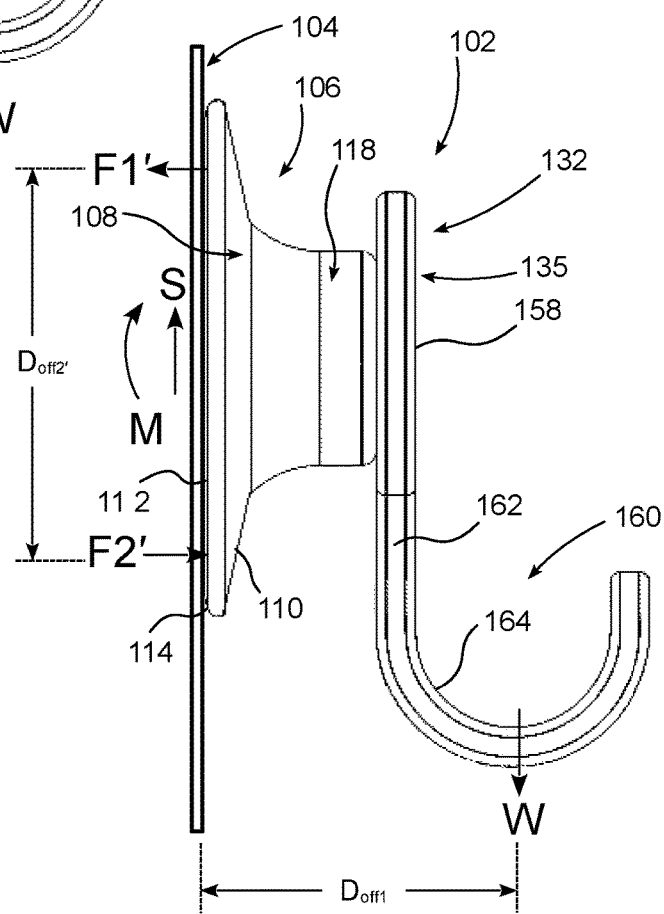
FIG. 15 is a side elevation view of a valve-actuated suction apparatus according to an alternative example embodiment that lacks the anti-rotation stabilizer of FIG. 14.
Figure 16:
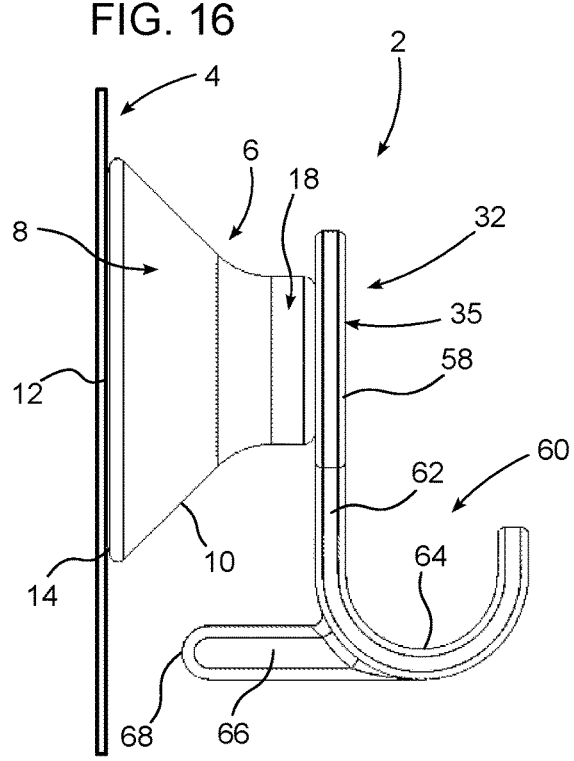
FIG. 16 is a side elevation view of the suction apparatus of FIG. 1 engaging a reference surface with a plunger valve thereof in a closed sealing position.

The benefit of using the anti-rotation stabilizer 66 may be appreciated by considering FIG. 15. FIG. 15 depicts a suction apparatus 102 according to an alternative example embodiment. The suction apparatus 102 is similar in most respects to the suction apparatus 2 (as shown by the used of corresponding reference numbers incremented by 100), the sole difference being that it lacks an anti-rotation stabilizer. In this embodiment, the pivot-inducing moment "M" generated by applying the object weight "W" at the offset distance "$D_{off1}$" from the reference surface 4 is reacted by a counteracting moment produced by a pair of equal and opposite coupling forces "F1'" and "F2'" of magnitude "F'," separated by an offset distance "$D_{off2'}$." As before, the coupling force "F1'" represents a tensile force that is distributed around the upper portion of the seal member inner side 12, such as near the upper region of the seal member peripheral edge 14. However, in contrast to the embodiment of FIG. 14, the coupling force "F2'" represents a compressive force distributed in some fashion around the lower portion of the seal member inner side 12, such as near the lower region of the seal member peripheral edge 14. Insofar as the coupling forces "F1'" and "F2'" in FIG. 15 are closer together than the coupling forces "F1" and "F2" in FIG. 14 (i.e., $D_{off2'} < D_{off2}$), the magnitude of "F'" in FIG. 15 will be proportionally higher than the magnitude of "F" in FIG. 14 in order to produce the same counteracting moment that counteracts the pivot-inducing moment "M" due to the object weight "W." This is given by the relationship $(F'*D_{off2'})=M=(F*D_{off2})$. Solving for "F'," it will be seen that $F'=F*(D_{off2})/D_{off2'}$. This means that given the same object weight "W," the suction apparatus 102 of FIG. 15 will tend to separate from the reference surface 4 more easily than the suction apparatus 2 of FIG. 14. The anti-rotation stabilizer 66 therefore advantageously increases the load-bearing capacity of the suction apparatus 2. The anti-rotation stabilizer 66 can also reduce downward bending of the anchor member 6 resulting from localized distortions caused by the object weight "W" being carried. This will help maintain the carrier hook 60 in its proper upright orientation.

Figure 17:
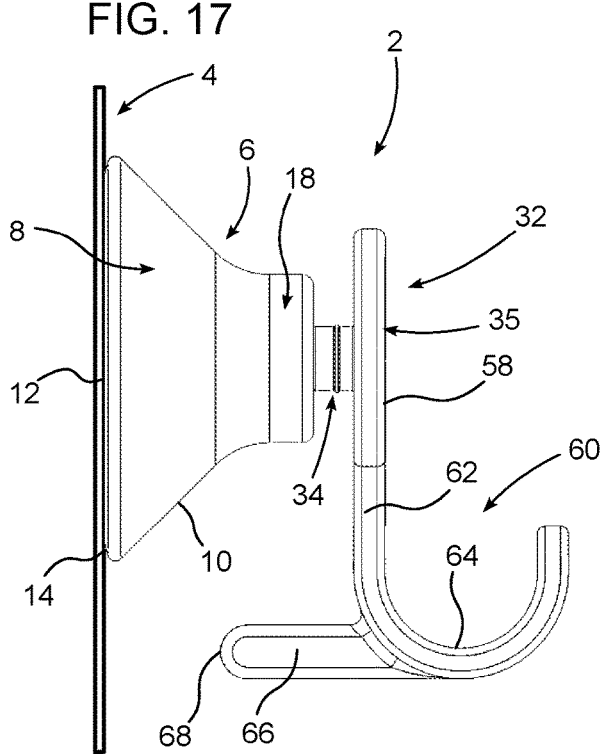
FIG. 17 is a side elevation view of the suction apparatus of FIG. 1 engaging a reference surface with a plunger valve thereof in an open venting position.

With reference now to FIGS. 16-19, a method of using the suction apparatus 2 will be described as a series of operations that need not be performed in any particular order. When it is desired to attach the suction apparatus 2 to the reference surface 4, the suction apparatus may be positioned so that the inner side 12 of the seal member 8 is in contact with the reference surface. The plunger valve 32 may be in either the closed position (FIG. 16) or the open position (FIG. 17). As shown in FIGS. 5-6, when the plunger valve 32 is in the closed position, the vent port stopper 52 plugs the second vent port section 28 and the valve stem stabilizer 40 maintains contact with opposing sidewall surfaces of the first vent port section 26. As shown in FIGS. 7-8, when the plunger valve 32 is in the open position, the vent port stopper 52 is retracted from the second vent port section 28, the valve stem air bypass neck 44 is disposed in the second vent section to channel air therethrough, and the valve stem stabilizer 40 engages the vent port internal shoulder 30, and may also maintain contact with opposing sidewall surfaces of the first vent port section 26.

When it is desired to seal the suction apparatus 2 to the reference surface 4, the suction apparatus may be manipulated by the user so that the plunger valve 32, and particularly the valve-actuating member 58 of the plunger valve head 35, is pushed toward the reference surface. As shown in FIG. 18, this will cause the plunger valve 32 to assume or maintain the closed position while flattening the base seal member 8 (as necessary according to the seal member's configuration) against the reference surface 4. This will establish and seal the controlled pressure zone 16, thereby rendering it airtight in order to maintain a negative pressure differential relative to the area of ambient pressure 44 outside the controlled pressure zone. If the carrier hook 60 includes the anti-rotation stabilizer 62, the tip 68 thereof will now engage the reference surface 4 below the seal member 8, and thus stabilize the suction apparatus 2 against pivoting (clockwise in the environment of FIG. 18) when an object is placed on the carrier hook.

Figure 19:
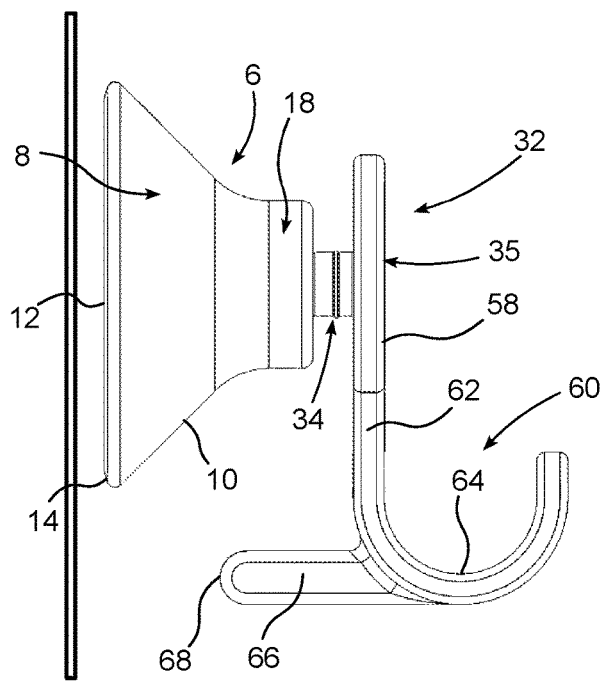
FIG. 19 is a side elevation view of the suction apparatus of FIG. 1 spaced from a reference surface with a plunger valve thereof in an open venting position.

When it is desired to detach the suction apparatus 2 from the reference surface 4, the plunger valve 32 may be actuated to the open position by pulling on the valve-actuating member 58 of the plunger valve head 35. This will vent the controlled pressure zone 16 and release the negative pressure differential relative to the area of ambient pressure 44 outside the controlled pressure zone. As shown in FIG. 19, the suction apparatus 2 may then be easily separated from the reference surface 4.

Accordingly, a valve-actuated suction apparatus has been disclosed. Although the suction apparatus has been described and shown in the context of certain example embodiments, it should be apparent that variations and alternative embodiments could be implemented in accordance with the present disclosure. The disclosed suction apparatus may be embodied in many different shapes and sizes to operate with many different types of auxiliary structures, including but not limited to bowls, buckets, cans, vases, urns, tanks, or other apparatus whose function is to hold or carry an object or material. Alternatively, the auxiliary structures may themselves represent objects or materials to be anchored instead of being holders or carriers for other objects or materials. Examples of such auxiliary structures include tools, implements, devices, equipment or other articles that could be integrated with, attached to, mounted on, or formed with the disclosed suction apparatus. Broadly speaking, the disclosed suction apparatus may be used for anything imaginable that a user might wish to anchor to a reference surface. Alternatively, it should be understood that the disclosed suction apparatus may be used for applications that do not involve auxiliary structures or the anchoring of object or materials other than the suction apparatus itself. Examples include medical applications such as therapeutic massage cupping, lifting applications such as sheet glass installation, and novelty/amusement applications.

Reference in the present disclosure to an "embodiment" means that a particular feature, structure or characteristic described in connection with the embodiment may be included in at least one embodiment of the disclosed apparatus. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples may be given throughout this description. These examples are merely descriptions of specific embodiments of the invention. The scope of the invention is not limited to the examples given.

As used in this application, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

It is understood, therefore, that the invention is not to be in any way limited except in accordance with the spirit of the appended claims and their equivalents.

What is claimed is:

1. A valve-actuated suction apparatus, comprising:
an anchor member comprising a non-porous resilient material;
the anchor member comprising a flexible base seal member having a seal member outer side, a seal member inner side, and a seal member peripheral edge;
the seal member inner side being configured to form a substantially airtight seal with a surface to define a controlled pressure zone, the controlled pressure zone comprising a region located between the seal member inner side and the surface;
the anchor member further comprising an anchor member stem having a stem base end disposed on the base seal member and a stem free end spaced from the stem base end;
a vent port extending through the anchor member stem;
the vent port comprising having a first vent port section and a second vent port section, the first vent port section being disposed in relative proximity to the stem base end and the second vent port section being disposed in relative proximity to the stem free end;
a vent port internal shoulder defined at an outer end of the first vent port section, the vent port internal shoulder facing toward the stem base end;
a plunger valve operable to selectively seal and unseal the vent port;
the plunger valve comprising a plunger valve stem;
the plunger valve stem being slidably disposed in the vent port and slidable between a closed position of the plunger valve wherein the vent port is sealed and an open position of the plunger valve wherein the vent port is unsealed;
the plunger valve stem comprising a first valve stem section and a second valve stem section;
the first valve stem section comprising a valve stem stabilizer configured to block against the vent port internal shoulder in the open position in order to prevent removal of the plunger valve from the vent port during normal operation of the suction apparatus;
the first valve stem section further comprising an air bypass neck that resides at least partially in the first vent port section when the plunger valve is in the closed position, and extends through the second vent port section when the plunger valve is in the open position, the air bypass neck being configured to channel air through the second vent port section when the plunger valve is in the open position;
the second valve stem section comprising a vent port stopper configured to plug the second vent port section when the plunger valve is in the closed position in order to prevent a passage of air through the vent port;
the closed position of the plunger valve comprising the vent port stopper plugging the second vent port section;
the open position of the plunger valve comprising the vent port stopper being retracted from the second vent port section, the air bypass neck extending through the second vent port section to channel air therethrough, and the valve stem stabilizer engaging the vent port internal shoulder;
wherein, when the plunger valve is pushed into the closed position while the base seal member is pressed against the surface, the base seal member will flatten against the surface to establish and seal the controlled pressure zone, thereby rendering it airtight in order to maintain a negative pressure differential relative to an area of ambient pressure outside the controlled pressure zone; and
wherein, when the plunger valve is pulled out to the open position while the base seal member is attached to the surface, the base seal member will detach from the surface due to the controlled pressure zone being vented, thereby releasing the negative pressure differential relative to the area of ambient pressure outside the controlled pressure zone.

2. The apparatus of claim 1, wherein the plunger valve comprises a plunger valve head comprising an external valve-actuating member disposed outside the vent port that enables the plunger valve to be pulled and pushed.

3. The apparatus of claim 1, wherein the vent port stopper is cross-sectionally larger than the second vent port section so as to create an interference fit when the vent port stopper engages the second vent port section with the plunger valve in the closed position.

4. The apparatus of claim 3, wherein the vent port stopper and the second vent port section each have a circular cross-section, and a diameter of the vent port stopper is larger than a diameter of the second vent port section.

5. The apparatus of claim 1, wherein the vent port stopper comprises a protruding transverse flange that engages a corresponding transverse channel in the second vent port section when the vent port stopper engages the second vent port section with the plunger valve in the closed position.

6. The apparatus of claim 5, wherein the vent port stopper and the second vent port section each have a circular cross-section, and wherein the transverse flange comprises a circular ring and the transverse channel comprises a circular groove.

7. The apparatus of claim 1, wherein the valve stem stabilizer comprises a set of protruding transverse valve stem guide prongs that are sized to engage opposing sidewall surfaces of the first vent port section.

8. The apparatus of claim 7, wherein there are four transverse valve stem guide prongs arranged 90 degrees apart.

9. The apparatus of claim 7, wherein the transverse valve stem guide prongs are disposed at an inner end of the first valve stem section when the plunger valve is in the closed position and at an outer end of the first valve stem section when the plunger valve is in the open position.

10. The apparatus of claim 1, wherein the air bypass neck comprises one or more axial air flow pathways on the first valve stem section.

11. The apparatus of claim 1, wherein the air bypass neck comprises one or more axial channels on the first valve stem section.

12. The apparatus of claim 11, wherein the one or more axial channels are formed by protruding longitudinal flanges on the first valve stem section.

13. The apparatus of claim 12, wherein there are four longitudinal flanges on the first valve stem section defining four axial channels that provide one or more axial air flow pathways of the first valve stem section.

14. The apparatus of claim 12, wherein the longitudinal flanges are spaced from a sidewall of the first vent port section, and comprise localized prongs that extend transversely from the longitudinal flanges and engage the sidewall of the first vent port section to define elements of the valve stem stabilizer.

15. The apparatus of claim 1, wherein the plunger valve comprises a plunger valve head that is formed with or mounts to an auxiliary structure configured to attach to an object or material that is to be anchored to a surface that is either vertical, horizontal or anywhere in between, or an auxiliary structure that itself represents an object or material that is to be anchored to a surface.

16. The apparatus of claim 15, wherein the auxiliary structure comprises a carrier hook for holding the object or material to be anchored to a vertical or other non-horizontal surface, the carrier hook comprising a downwardly-depending carrier hook leg section and a carrier hook trough section.

17. The apparatus of claim 16, wherein the carrier hook comprises an anti-rotation stabilizer that engages the surface below the base seal member when the suction apparatus is anchored thereto in order to increase a load-bearing capacity of the suction apparatus by counteracting a load-induced rotational moment applied to the carrier hook due to the weight of the object to be anchored.

18. The apparatus of claim 15, wherein the auxiliary structure comprises an anti-rotation stabilizer that engages the surface when the suction apparatus is anchored thereto in order to increase a load-bearing capacity of the suction apparatus by counteracting a load-induced rotational moment applied to the suction apparatus.

19. A valve-actuated suction apparatus, comprising:
an anchor member comprising a non-porous resilient material;
the anchor member comprising a flexible base seal member and an anchor member stem;
the base seal member being arranged to seal against a surface;
the anchor member stem comprising a vent port extending therethrough;
a plunger valve operable to selectively seal and unseal the vent port;
the plunger valve comprising a plunger valve head and a plunger valve stem;
the plunger valve stem being slidably disposed in the vent port and slidable between a closed position of the plunger valve wherein the vent port is sealed and an open position of the plunger valve wherein the vent port is unsealed;
the plunger valve head being formed with or mounted to a carrier hook;
the carrier hook comprising a downwardly depending carrier hook stem and a carrier hook trough configured to hold an object or material to be anchored to a substantially vertical surface using the suction apparatus;
the carrier hook comprising an anti-rotation stabilizer arranged to engage the surface below the base seal member when the carrier hook is holding the object or material to be anchored, the anti-rotation stabilizer being operable to increase a load-bearing capacity of the suction apparatus by counteracting a load-induced rotational moment applied to the carrier hook due to the weight of the object to be anchored.

20. A method of use for a valve-actuated suction apparatus of claim 1, comprising (in no particular order):
positioning the suction apparatus so that the base seal member is in contact with the surface, with the plunger valve in either the closed position or the open position;
maneuvering the suction apparatus so as to cause the plunger valve to assume or maintain the closed position while flattening the base seal member (as necessary) against the surface to establish and seal the controlled pressure zone, thereby rendering it airtight in order to maintain a negative pressure differential relative to the area of ambient pressure outside the controlled pressure zone; and
actuating the plunger valve to the open position while the base seal member is attached to the surface to detach the base seal member from the surface due to the controlled pressure zone being vented, thereby releasing the negative pressure differential relative to the area of ambient pressure outside the controlled pressure zone.

21. A valve-actuated suction apparatus, comprising:
an anchor member comprising a non-porous resilient material;
the anchor member comprising a flexible base seal member and an anchor member stem;
the base seal member being arranged to seal against a surface;
the anchor member stem comprising a vent port extending therethrough;
a plunger valve operable to selectively seal and unseal the vent port;
the plunger valve comprising a plunger valve stem;
the plunger valve stem being slidably disposed in the vent port and slidable between a closed position of the plunger valve wherein the vent port is sealed and an open position of the plunger valve wherein the vent port is unsealed; and
the plunger valve stem comprising a continuous protruding transverse flange that engages into a corresponding continuous recessed transverse channel in the vent port when the plunger valve is in the closed position to provide an interlock mechanism that serves to fix the plunger valve in the closed position.

* * * * *